(No Model.)
H. L. QUIGLEY.
HORSE COLLAR FASTENER.
No. 586,056. Patented July 6, 1897.
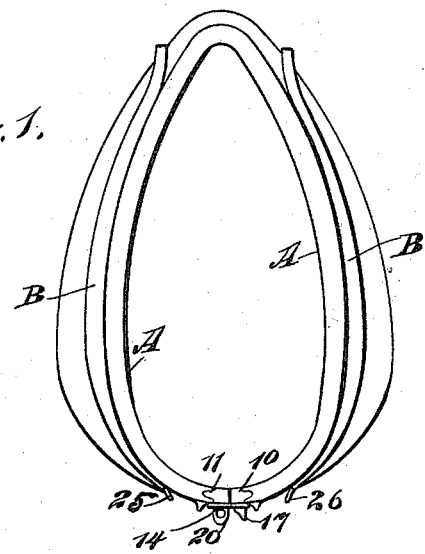
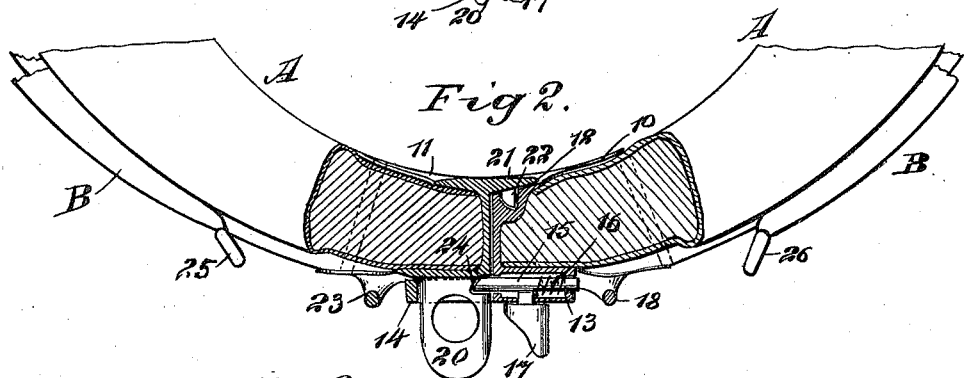
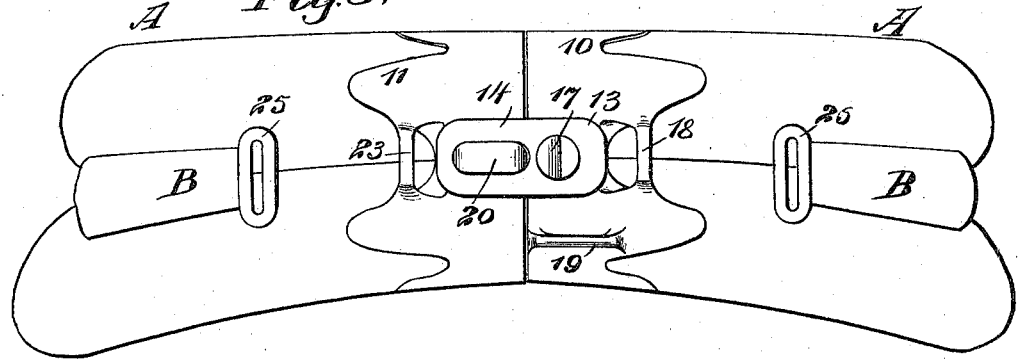
WITNESSES:
INVENTOR
H. L. Quigley
BY
ATTORNEYS.

UNITED STATES PATENT OFFICE.

HUGH LEE QUIGLEY, OF JENNINGS, MISSOURI.

HORSE-COLLAR FASTENER.

SPECIFICATION forming part of Letters Patent No. 586,056, dated July 6, 1897.

Application filed August 14, 1896. Serial No. 602,752. (No model.)

*To all whom it may concern:*

Be it known that I, HUGH LEE QUIGLEY, of Jennings, in the county of St. Louis and State of Missouri, have invented a new and useful Improvement in Horse-Collars and Hames, of which the following is a full, clear, and exact description.

The object of the invention is to provide a simple, durable, and economic device for securing the ends of horse-collars and hames, by means of which device the collar and hames may be expeditiously and conveniently adjusted on a horse or removed without being detached from the harness, thereby saving time and labor and wear and tear of the collar and harness.

A further object of the invention is to construct the device in a manner that will render it capable of the above-named functions, and which may be fitted to any harness by even an inexperienced person.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of a collar and hames having the improvement applied. Fig. 2 is an enlarged view of the collar and hames at the throat portions thereof, the collar being partially in section and the attachment also in section; and Fig. 3 is a bottom plan view of the collar and hames and the device applied to the collar.

In carrying out the invention the collar A may be of the usual construction, and likewise the hames B, and the collar is divided at its front portion. Each end of the collar is contained within a ferrule preferably made of metal, the ferrule on one end of the collar being designated as 10 and the opposing ferrule as 11, as illustrated particularly in Figs. 2 and 3. The ferrule 10 has a recess or aperture 12 made in its upper face at its center, near the outer end, and at the lower central portion of this ferrule 10 a boxing 13 is constructed, and from the boxing a link 14 is projected, capable of passing beneath the ferrule 11 on the opposite end of the collar when the two ferrules are brought together.

In the boxing 13 a pin 15 is held to slide, and the said pin is normally held in such position that it will extend within the link 14 by means of a spring 16, and the pin 15 has a knob 17 attached to it, by means of which the pin is manipulated, or may be drawn at its contracted end within the boxing, the projecting end of the pin being more or less beveled. The ferrule 10 is further provided at its bottom inner or rear central portion with a loop 18, and near the outer side with a second loop 19, as shown in Fig. 3.

A projection 20 is formed upon the central lower portion of the ferrule 11, and this projection is provided with an opening whereby it is in the nature of an eye, and the projection is adapted to enter and pass through the link 14. At the upper central portion of the ferrule 11 a tongue 21 is formed, which extends beyond the outer end of the ferrule and is so shaped that it will fit snugly to the upper surface of the opposing ferrule 10 when the two ferrules are brought together. The tongue 21 has a stud 22 formed thereon, which when the two ends of the collar are brought together enters the recess 12 in the ferrule 10, as illustrated in Fig. 2, and upon the bottom rear portion of the ferrule 11 a loop 23 is formed.

In operation, when the collar has been placed upon the horse and it is desired to secure the ends of said collar together, the two ferrules are brought in close contact and the link 14 is carried upward over the eye or projection 20 until the spring-controlled or snap pin 15 shall have entered a recess 24 in the projection, as shown in Fig. 2, and the stud 22 of the tongue 21 shall have entered the recess 12 in the ferrule 10. The ends of the collar will now be held firmly together.

It will be obvious that the faces of the ferrules that are brought together contain no recesses or projections. In fact there is nothing at this point to prevent a close connection between the ferrules.

The loops 18 and 23 on the ferrules are connected with the loops 25 and 26 on the hames by means of straps or their equivalents, and the loop 19 on the ferrule 10 is intended to receive a small strap by means of which the martingale is suspended in order to keep it in place when the collar is unfastened. The opening in the projection 20 of the ferrule 11 is provided for the reception of a hold backstrap, thereby providing a means of security in addition to the pin 15. When it is desired to remove the collar, it is simply necessary to draw the knob 17 of the snap-pin backward, releasing it from the projection 20, whereupon the section of the collar having the snap-pin attached may be carried downward and thus disconnected from the opposing section of the collar.

Having thus described my invention, I claim as new and desire to secure by Letters Patent—

1. A horse-collar divided at the throat and having its ends provided with ferrules arranged for close engagement, one ferrule having a recess in its upper portion and a snap-pin at its lower portion, together with a link, the opposite ferrule being provided with an eye arranged to enter the said link and a tongue adapted to enter the recess in the upper portion of the opposing ferrule, one of the said ferrules being provided upon its under surface with a loop and also a loop at one side, the opposite ferrule having a loop at its end only, as and for the purpose set forth.

2. A horse-collar, divided at the throat, the horse-collar having a ferrule secured to each contiguous end thereof, a tongue secured to one ferrule and projecting transversely therefrom, a stud carried by the tongue and extended downward therefrom, a projection extending downwardly from the section having the tongue and a spring-pressed pin carried by the remaining ferrule and capable of engaging with the projection to hold the ends of the collar in connection, one of the ferrules having a cavity capable of receiving the stud on the tongue.

3. A horse-collar having a division forming two contiguous ends, a ferrule secured to each of said ends, a projection attached to one ferrule, a link attached to the remaining ferrule and capable of receiving the projection, a pin carried by said remaining ferrule and adjacent to the link and capable of locking with the projection, a tongue extending on the ferrule having the projection, and a stud carried by said tongue and engaging with the opposite ferrule.

4. A horse-collar divided at the throat, one of the contiguous ends of the horse-collar having a tongue projecting toward the second contiguous end, a stud carried by said tongue and adapted to fit into a recess in the said second contiguous end by which means the said contiguous ends are prevented from being drawn apart in a longitudinal line, and means located oppositely to the tongue, such means preventing the movement of the contiguous ends laterally with reference to each other.

HUGH LEE QUIGLEY.

Witnesses:
MILTON B. PUNNETT,
FRANK H. HASKINS.